United States Patent [19]

Lim

[11] Patent Number: 5,490,958
[45] Date of Patent: Feb. 13, 1996

[54] FILLER FOR HEAT EXCHANGER

[76] Inventor: In C. Lim, 663-21, Yeoksam-dong, Kangnam-ku, Seoul 135-030, Rep. of Korea

[21] Appl. No.: 375,154

[22] Filed: Jan. 18, 1995

[30] Foreign Application Priority Data

Jan. 18, 1994 [KR] Rep. of Korea .................. 888/1994

[51] Int. Cl.⁶ .................................................. B01F 3/04
[52] U.S. Cl. ............................................... 261/112.1
[58] Field of Search ............................ 261/112.1, 111

[56] References Cited

U.S. PATENT DOCUMENTS

| | | | |
|---|---|---|---|
| 3,343,821 | 9/1967 | Winn et al. | 261/112.1 |
| 4,020,130 | 4/1977 | Ovard | 261/111 |
| 4,107,241 | 8/1978 | Braun | 261/112.1 |
| 4,427,606 | 1/1984 | Chen et al. | 261/111 |
| 4,497,752 | 2/1985 | Huber | 261/112.1 |
| 4,557,876 | 12/1985 | Nutter | 261/112.1 |
| 4,744,928 | 5/1988 | Meier | 261/112.1 |

*Primary Examiner*—Tim R. Miles
*Attorney, Agent, or Firm*—Watson, Cole, Grindle & Watson

[57] ABSTRACT

An improved filler for cooling tower is disclosed. The filler comprises a substantially rectangular frame (1) which includes several horizontally extending rods 1a and two vertically extending rods 1b each of which connects the ends of said horizontally extending rods respectively at both ends thereof, and a series of consecutive protrusion plates 2 which are formed by two substantially triangular plates between each adjacent horizontal rods 1a, wherein the upper side 21 and lower side 22 of said protrusion plate 2 are secured on the adjacent horizontal rods 1a respectively and the middle portions 25 of said protrusion plates protrude forward in a certain height.

6 Claims, 9 Drawing Sheets

5,490,958

FILLER FOR HEAT EXCHANGER

FIELD OF THE INVENTION

This invention relates to a heat exchanger and, particularly, to an improved filler which is suitable for use in those types of liquid-gas direct contact heat exchangers such as cooling towers.

Heretofore, many different types of heat exchanging fillers have been proposed for use in connection with water cooling towers. Conventionally, in such devices, the water to be cooled is delivered and distributed onto the top of the filler so that the water drips downward through the channels or passageways formed by the filler. At the same time air is forced horizontally or upward penetrating through the filler to create a direct contact with the water stream by its counter or cross flow in which the water is cooled by evaporative action.

FIG. 7 shows a conventional cooling tower which is generally cylindric in configuration and has a fan 33 for drawing air through the interior of the tower in the direction indicated by the arrow A. Water to be cooled is delivered through pipe 37 into a conventional pipe header or spray nozzle 34, from which it is discharged by gravity onto the filler 31. A collecting basin 35 receives the cooled water from the bottom of the filler and the water is returned through a return pipe 38 to the system.

Since in a heat exchanger which employs a liquid and a gas that are brought into direct contact with each other for the purpose of effecting a transfer of heat from one medium or the other, the efficiency of heat exchange is in general dependent on the amount of liquid surface area that comes into contact with the gas, the heat exchanger generally employs some fillers which are so devised as to increase contacting area between the two heat exchanging media as possible. For this, many conventional heat exchangers employ a film type filler composed of a plurality or roll of thin synthetic resin sheets arranged in stacked or rolled arrangement by means of spaced and/or staggered spacer or protrusion formed on the surfaces thereof, which creates vertical passageways through which water to be cooled runs downward and gas flows upward or horizontally.

However, these type of fillers for cooling towers have some drawbacks as follows.

One of the problems associated with thin film type filler is that gas is required to flow through passageways which are relatively small in cross section and further the gas is required to follow a parallel path to the water stream while being kept within the confines of the filler structure. These factors result in relatively high resistance to flow of the gas stream and, thus, show a drop in heat transfer efficiency. Further, since this conventional film type is made of very thin sheet whose thickness is about 0.2 mm~0.3 mm, it is easily crushed and vulnerable to heat and load and, therefore, has inferior durability.

Yet another constraint is that the passageways, being necessarily small in an effort to obtain maximum liquid surface area in a given volume, can easily plug up if any solid foreign matter or chemical substance such as water scale or dust, which tends to precipitate in a certain period, is present in either the liquid or gas during its circulation. If the passages are blocked it is not easy to wash the filler due to its fragility and, therefore, the filler cannot but be replaced by a new one.

In case of replacement of the filler with a new one the treatment of the fill to be discarded is considerably troublesome due to its material feature. That is, this kind of filler is generally so formed of polyethylene or polypropylene resin that it can seldom be decomposed nor proper to burn due to its toxic combustion gas and, further, it is improper to make reuse or recycle of it since the amount of raw material of the filler is relatively small in comparison with the amount of the foreign matter piled up therein.

SUMMARY OF THE INVENTION

Therefore, one of main objects of the present invention is to provide a filler for cooling tower which has a high yield of heat exchange by making the air stream to be introduced into the filler fluntuant or meandering.

Another object of the present invention is to provide a filler for cooling tower which has a relatively longer durability and is so hard and rigid that the foreign substance piled up between the passageways can be washed with ease and, therefore, the filler can be reused almost permanently.

Still another object of the invention is to provide a filler for cooling tower which can be easily settled inside of the cooling tower.

Further objects and advantages of the invention will become apparent from the following description referring to the accompanying drawings.

DETAILED DESCRIPTION OF THE INVENTION

Figure 1:
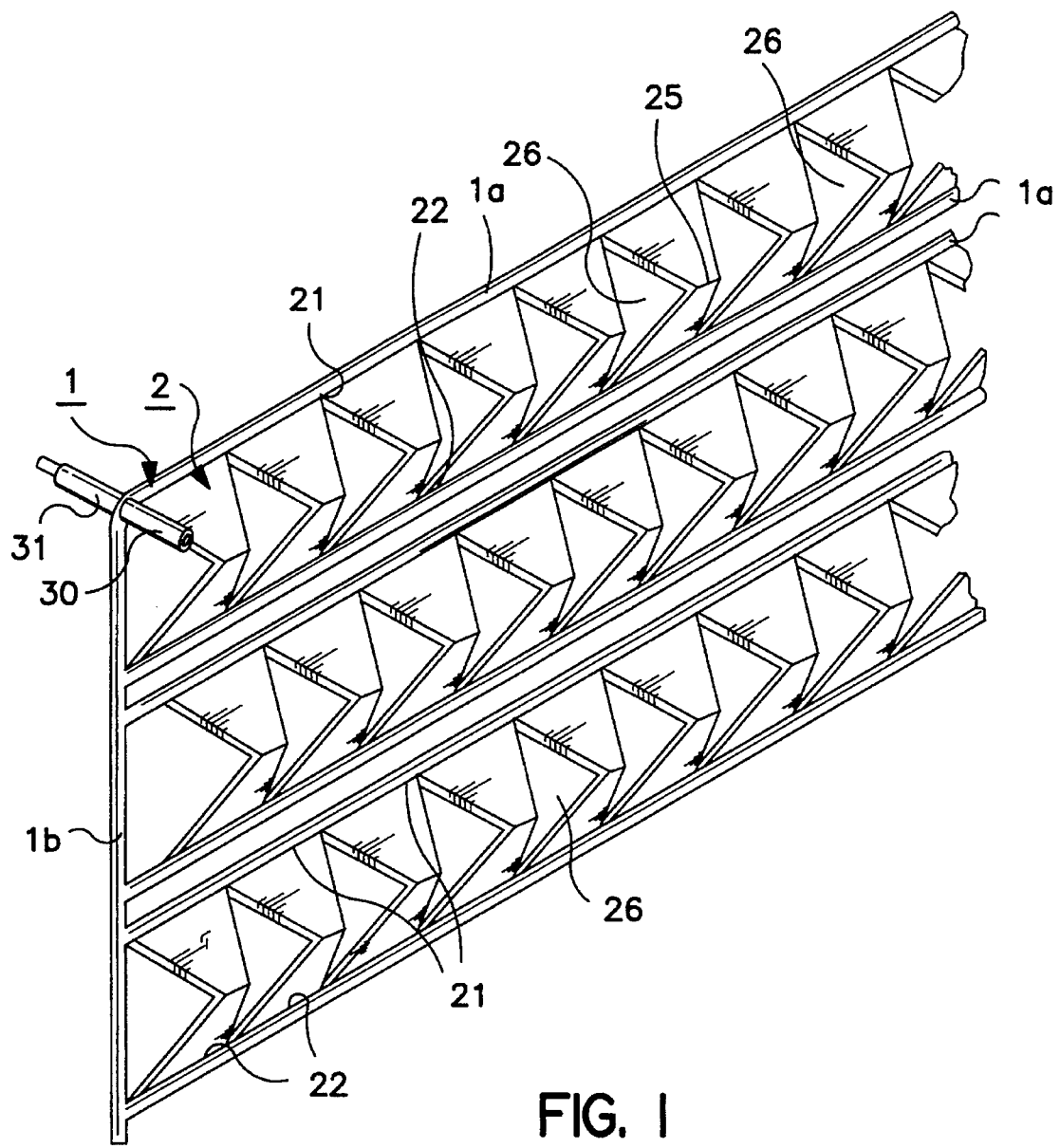
FIG. 1 shows a perspective view of the filler designed according to the present invention.
Figure 2A:
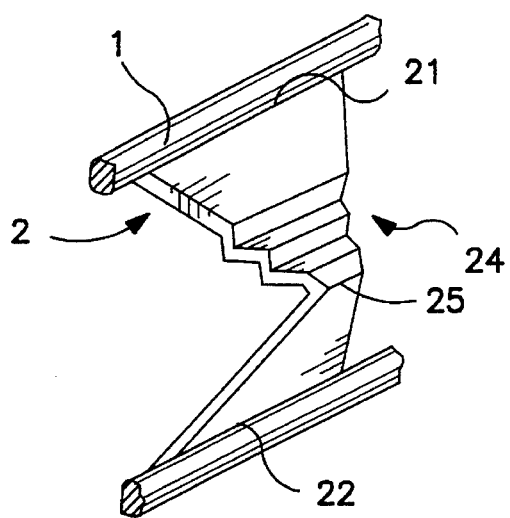
FIGS. 2(a), (b), (c), (d), (e) and (f) show a variety of protrusion plates which form parts of the filler of the present invention.
Figure 2B:
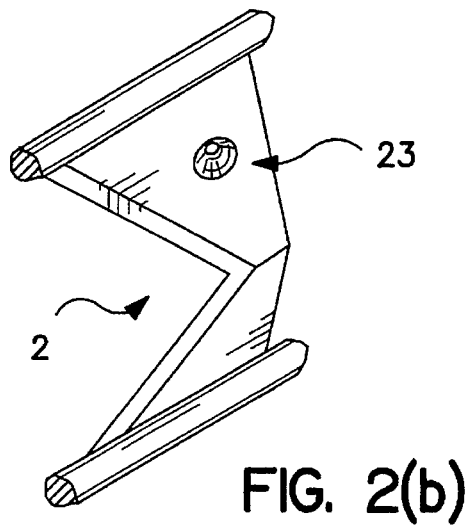
Figure 2C:
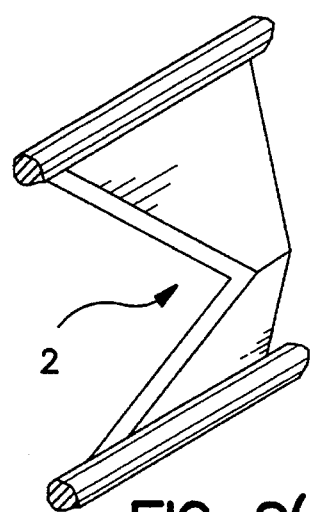
Figure 2D:
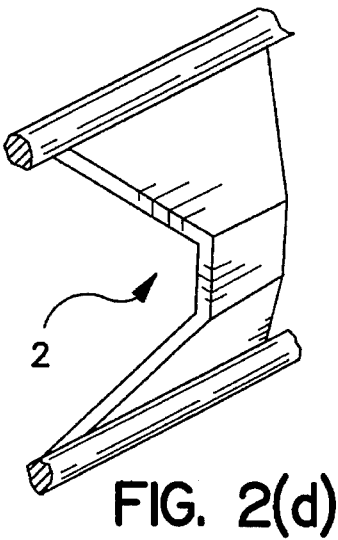
Figure 2E:
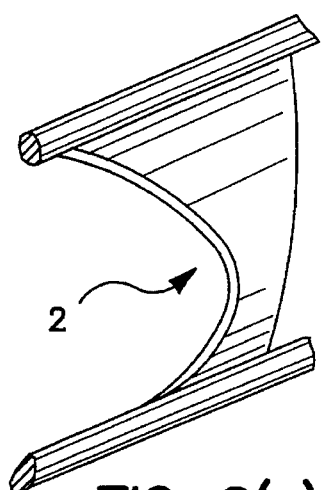
Figure 2F:
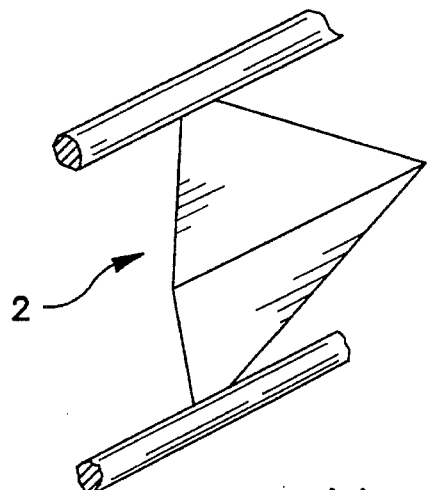
Figure 3A:
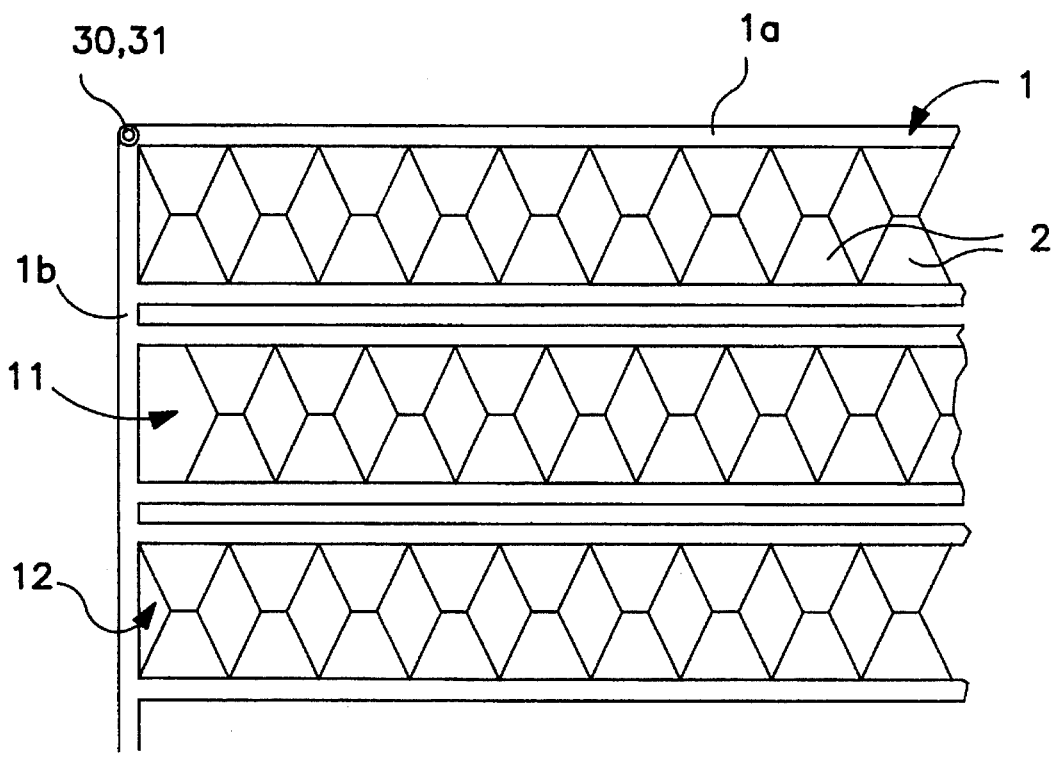
FIGS. 3(a), (b) and (c) show embodiments of the filler according to the present invention.
Figure 3B:
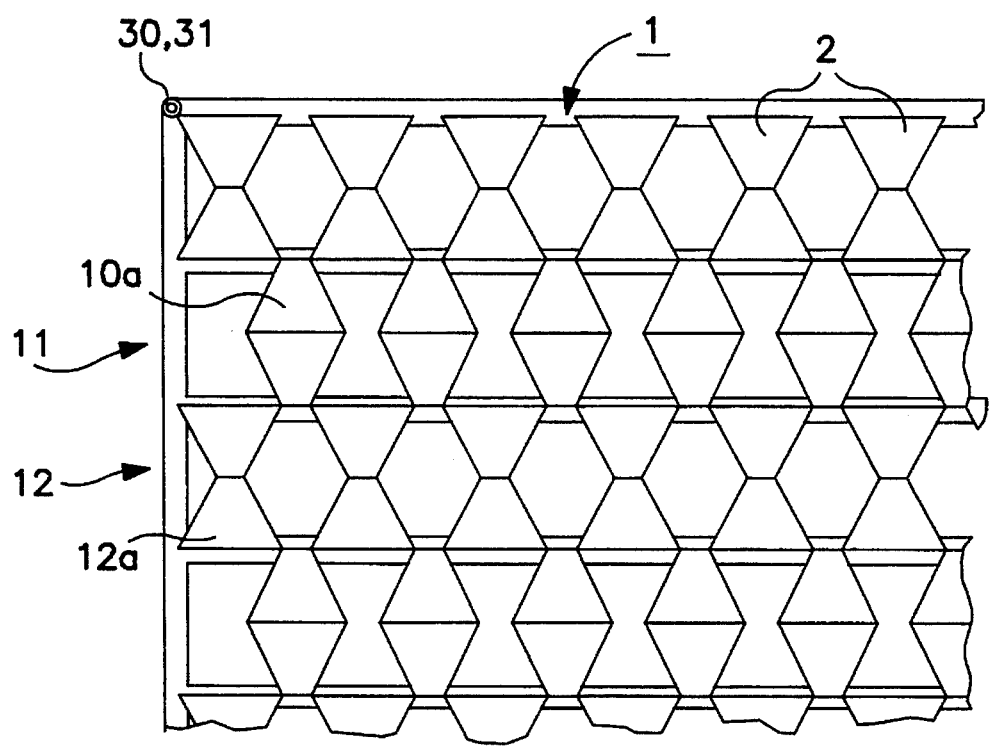

As shown in FIG. 1, the filler according to the present invention comprises a substantially rectangular frame 1 which includes several horizontally extending rods 1a and two vertically extending rods 1b (in this figure only left one is shown)each of which connects all the ends of said horizontally extending rods 1a respectively at both ends thereof, and a series of consecutive protrusion plates 2 which are formed between each adjacent horizontal rods 1a, wherein the upper side 21 and the lower side 22 of said protrusion plates are secured on the adjacent horizontal rods 1a respectively, and their middle portions 25 protrude :forward. The length of the upper side 21 of said protrusion plates 2 is identical that of the lower side 22 but the length of the middle portion 25 is shorter than that of the upper side 21 or lower side 22, whereby there form a series of substantially diamond-shaped apertures 26 between each adjacent protrusion plates 2 through which air can flow. As can be seen in FIG. 1, FIG. 3(a) and FIG. 3(b) it is preferable that said protrusion plates 2 are staggered by a pitch with respect to one another to form zig-zag rows 11, 12 alternatively.

FIGS. 2(a) to 2(f) show a variety of protrusion plates 2 which can be substituted by the one described above. These embodiments of protrusion plates are contemplated so as to increase the contacting area of water and smoothen the air flow. Stepped portion 24 shown in FIG. 2(a) and rounded protrusion 23 shown in FIG. 2(b) can serve to prevent direct flowing of water.

The filler depicted in FIG. 3(a) is different from that in FIG. 3(b) in the light that the former has rows of horizontal rods which has no protrusion plates between adjacent rows of plates 2 and the latter has alternative forms 10a, 12a of protrusion plates.

Figure 3C:
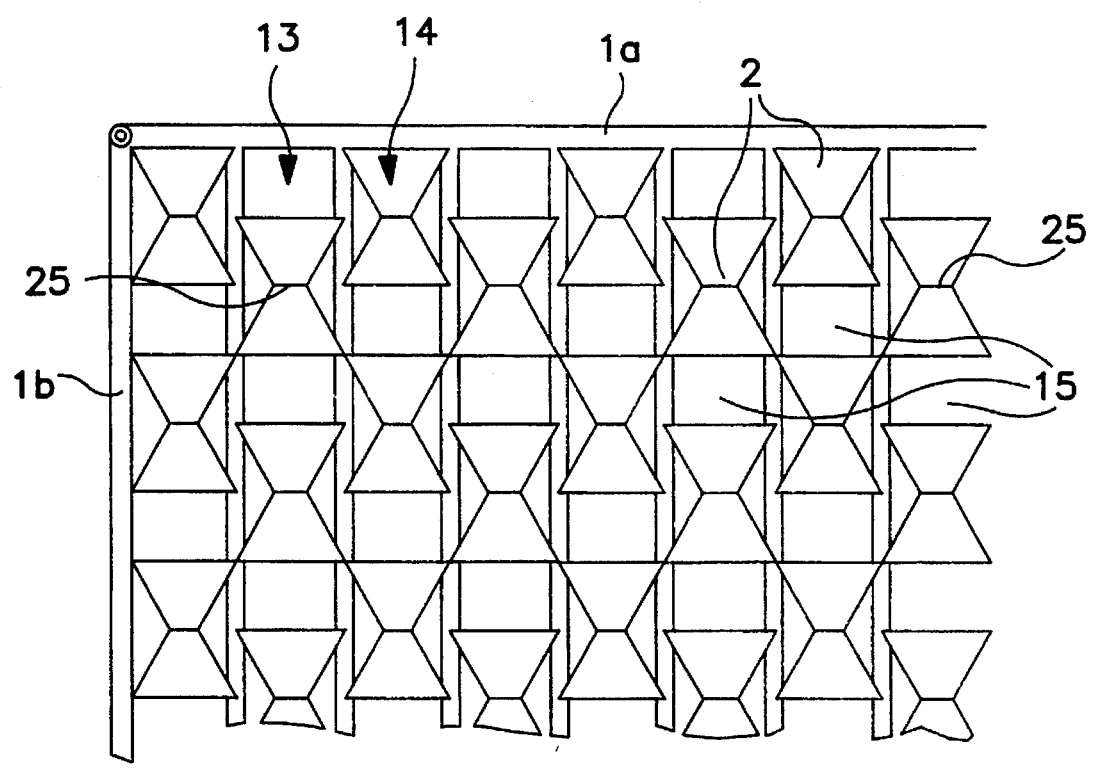

FIG. 3(c) shows another embodiment of the filler according to the present invention which comprises a substantially rectangular frame 1 including several vertically extending rods 1b and two horizontally extending rods 1a (in this figure only upper one is shown) each of which connects all the ends of said vertically extending rods 1b respectively at both ends thereof, and a series of consecutive protrusion plates 2 each of which is composed of two substantially triangular plates whose peak meeting point 25 protrudes forward and secured on both adjacent vertical rods 1b. Said protrusion plates are so arranged as to be apart from each other in a vertical direction and, thus, to form rectangular apertures 15 therebetween, and each adjacent vertical row of said protrusion plates 13, 14 is staggered by a half pitch.

It should be noted that the configuration and/or arrangement of said protrusion plates are not limited to said embodiments but include a number of varieties of staggering pitch or securing position.

The filler described above can be stacked in lateral direction by forming a pair of protruded male-female connections 30, 31 on each corner of the filler as shown in FIG. 1 and FIGS. 4(a) to 4(c). This connection structure facilitates to stack the fillers with an equal distance between one another and can serve to settle the assemblage of the filler into the cooling tower with ease.

Figure 4A:
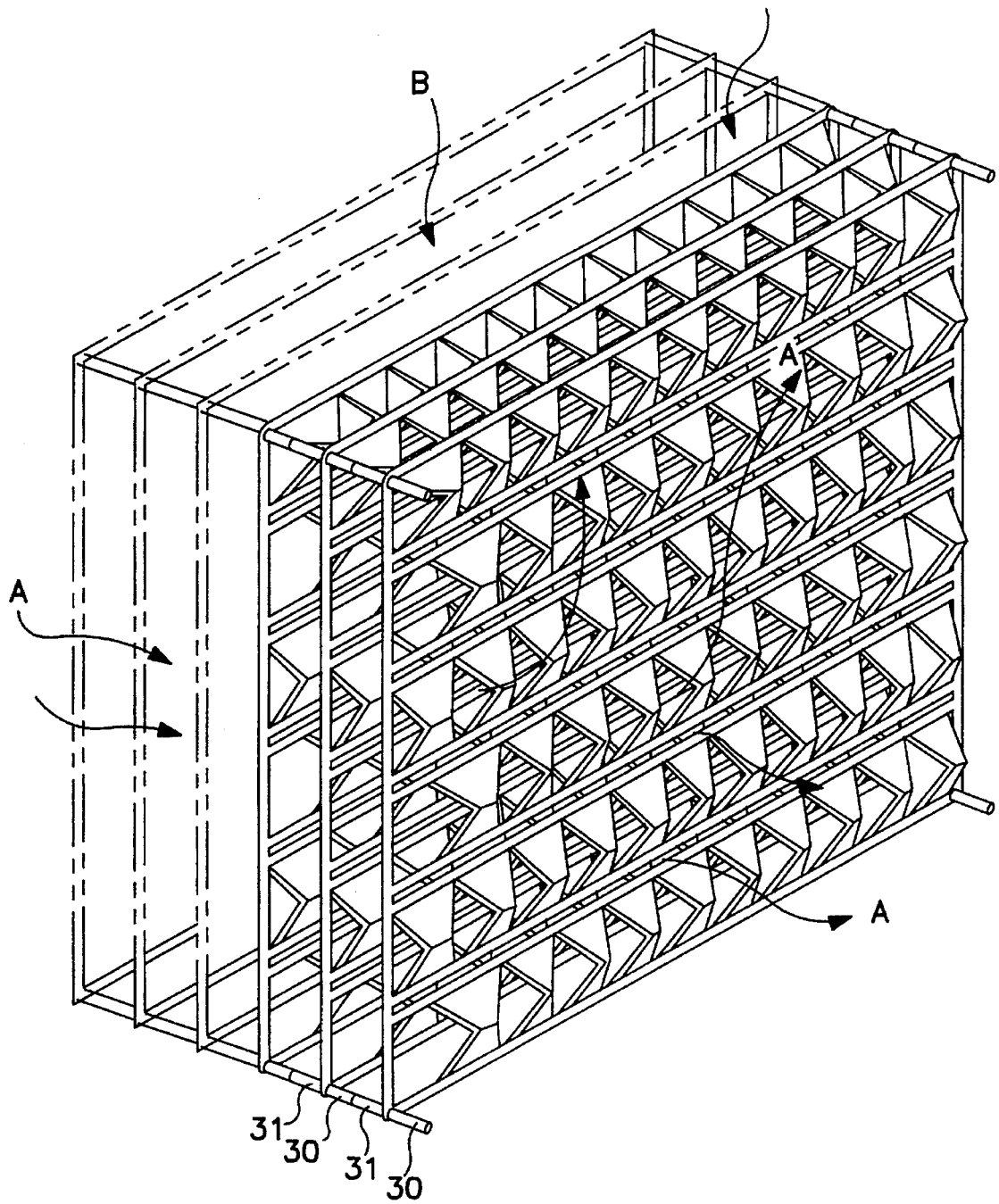
FIGS. 4(a), (b) and (c) show embodiments of assemblage of the filler according to the present invention.
Figure 4B:
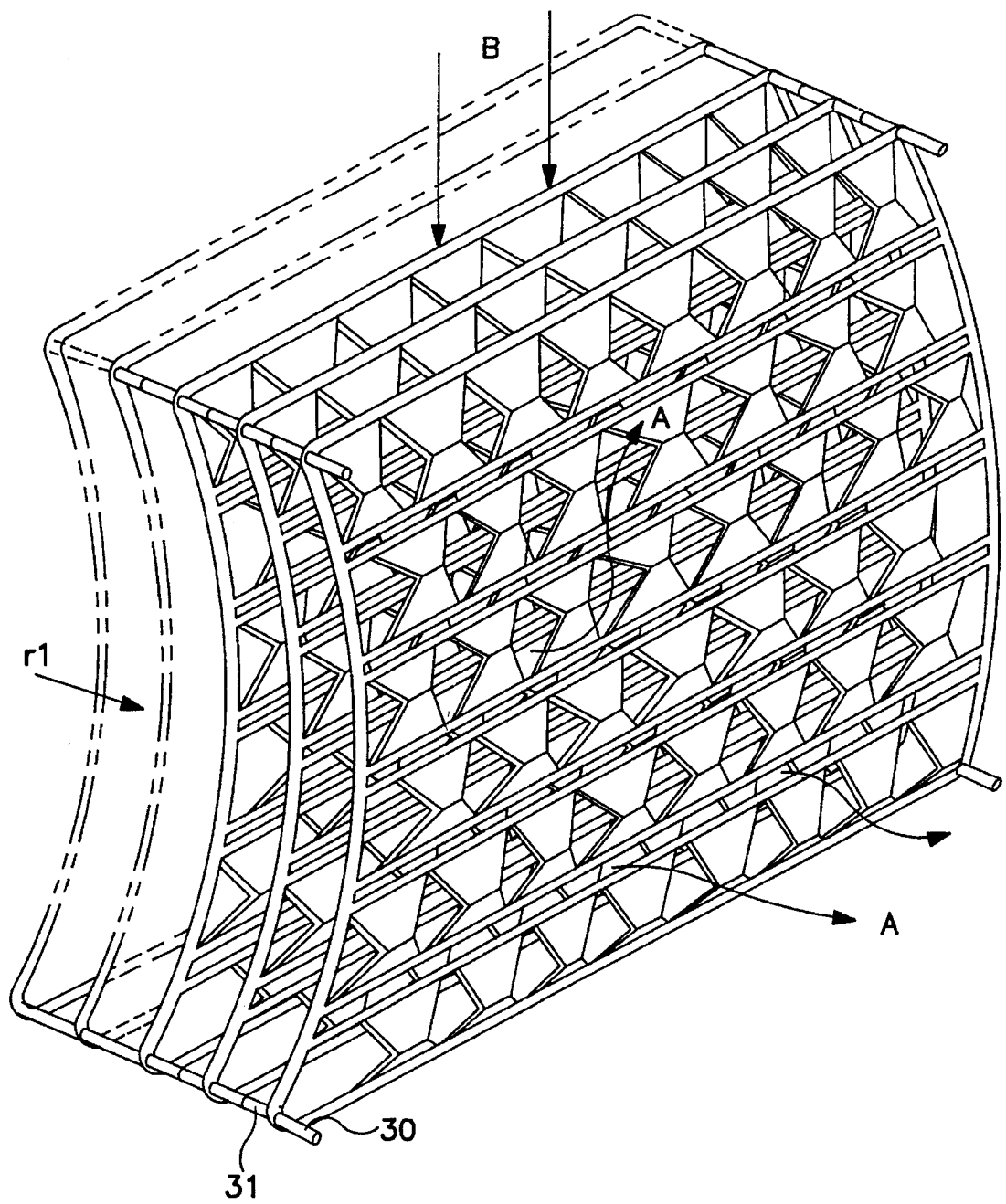
Figure 4C:
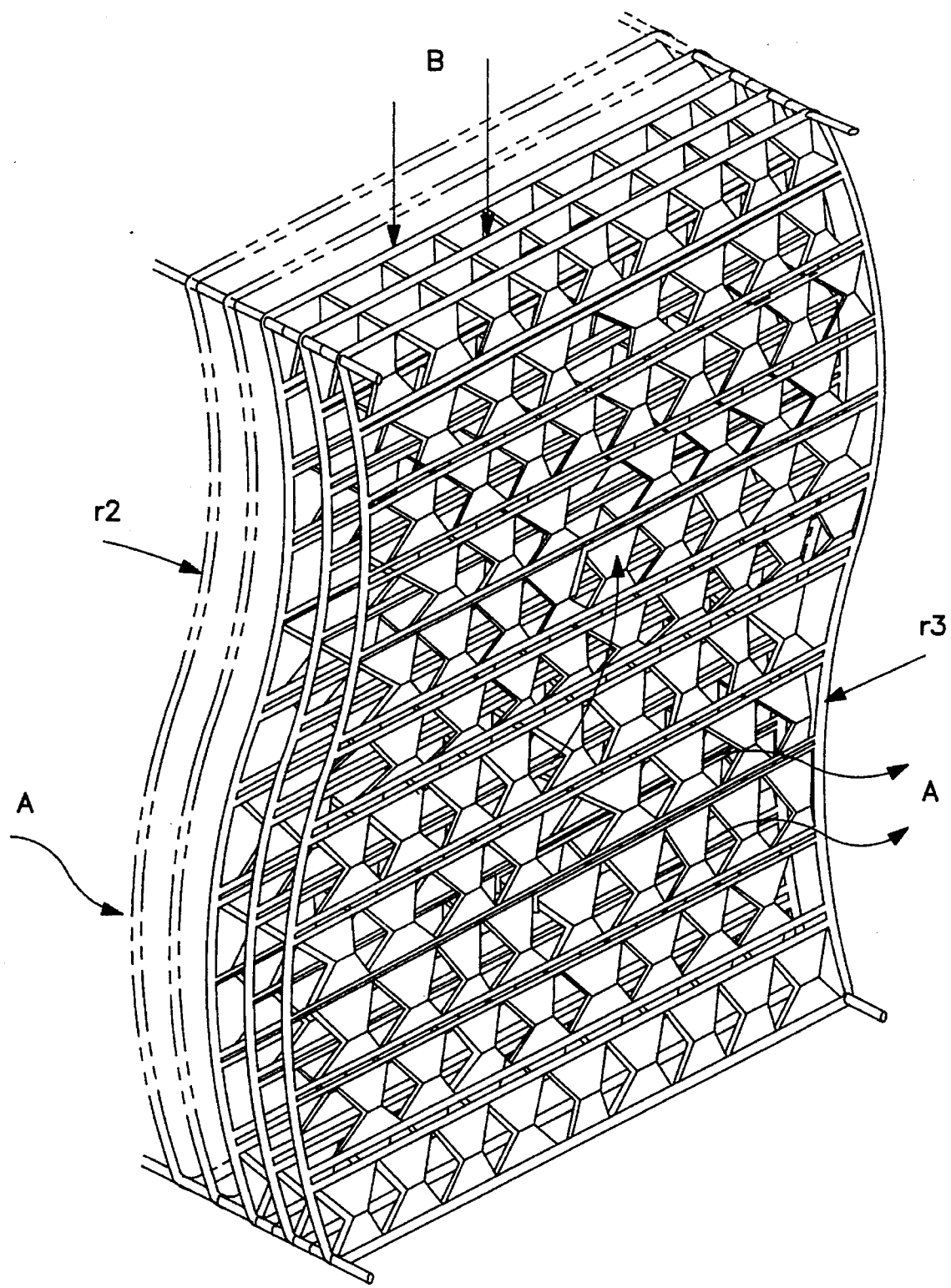
Figure 5A:
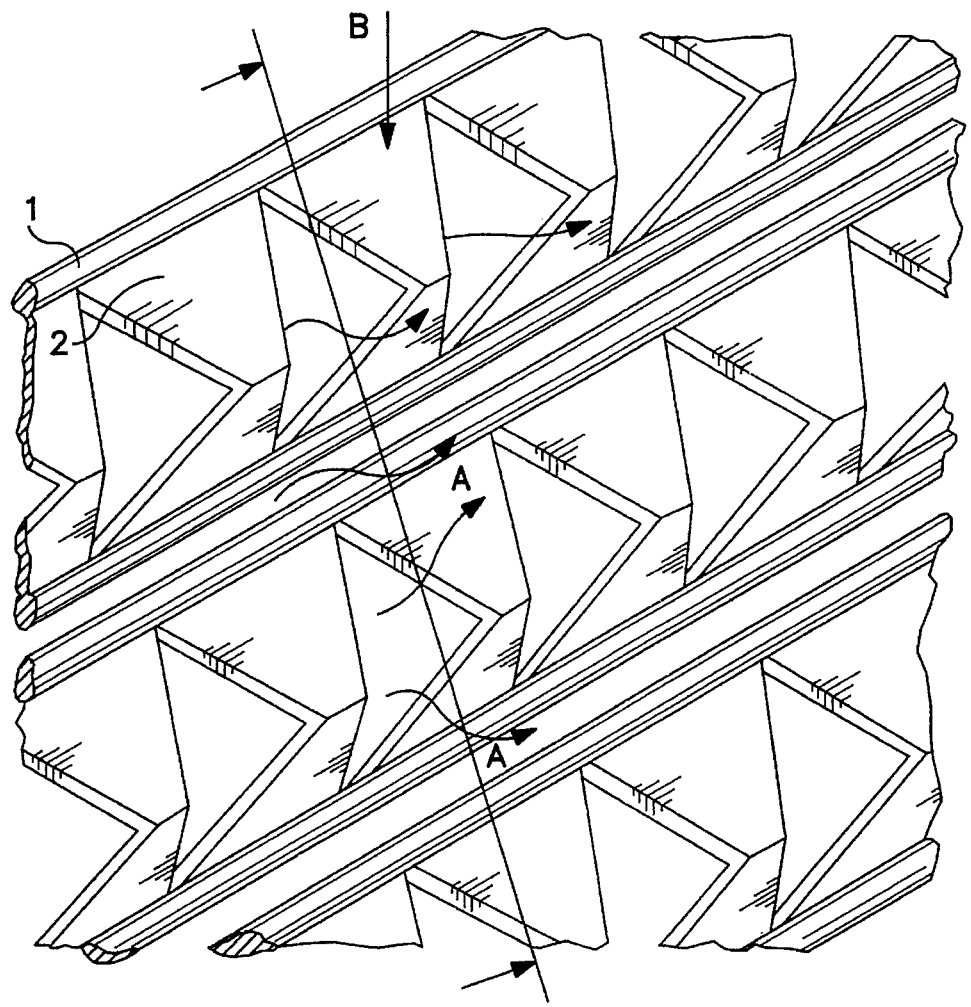
FIGS. 5(a) and (b) show air streams when using the filler according to the invention.
Figure 5B:
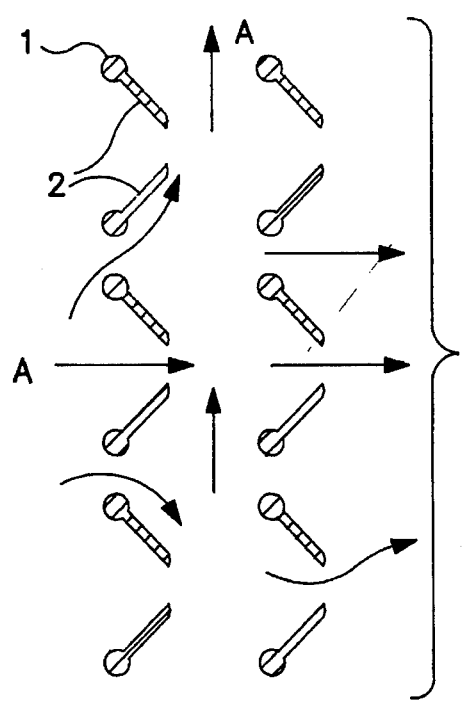
Figure 6:
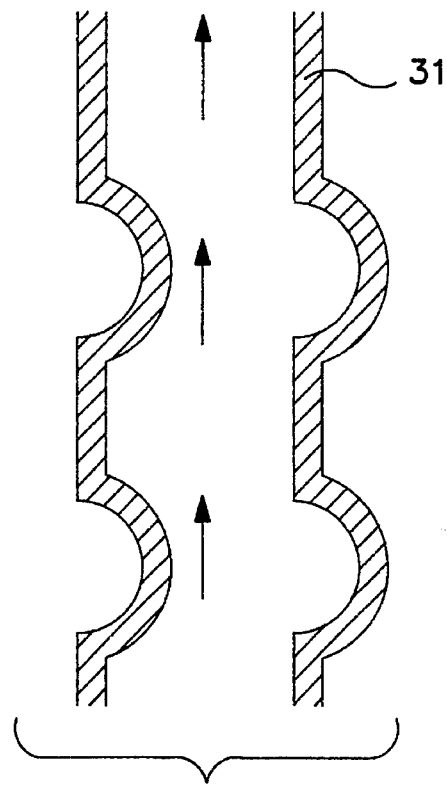
FIG. 6 shows a air stream when using a conventional filler.
Figure 7:
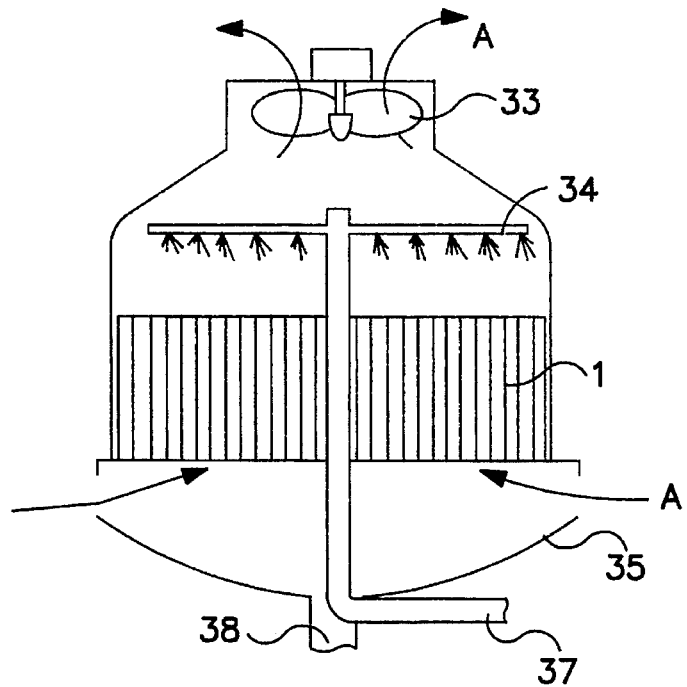
FIG. 7 shows a diagrammatic sectional view of a conventional cooling tower.

As shown in FIGS. 4(a) to 4(c), the assemblage of the fillers may have not only straight configuration but also a certain curvature r1 or curvatures r2, r3 so as to promote dispersing of water when the latter drips by gravity from the top of the assemblage and also to promote smoothening the flow of air by staggering the apertures. In these figures the arrow A indicates the direction of air flow and the arrow B indicates the direction of water drops.

It is desirable that the thickness of frame and protrusion plates is about 1 mm~3 mm and more, preferably, the thickness of the frame 1 being about 3 mm and that of the protrusion plates being 1 mm, these structure making the filler so hard and rigid as to be washable without any breakness and, accordingly, to be durable and reusable.

The filler according to the present invention one of whose characteristics is to form a lot of apertures on the surface thereof can be accomplished by means of injection molding method, which is impossible by that of the conventional thin film type filler that uses a vacuum forming method requiring no aperture.

From the structure of the filler and its assemblage described above it is feasible to yield a high efficiency of heat exchange between the two flows to be heat-exchanged by making much more amount of flow of air to be introduced into the filler fluctuant and/or meandering horizontally and/or vertically through said aperatures and/or through the vertical passageways formed between the fillers.

Further, the present invention can make the structure of the filler and its assemblage hard and rigid enough to wash the scale or dust piled up during operation with ease but without any breakness thereof even by using a high pressure air or water washing method and, thus, to reuse the filler. Therefore, it is sure that present invention contributes to prevent environmental contamination.

What is claimed is:

1. A filler for cooling tower comprising a substantially rectangular frame which includes several horizontally extending rods and two vertically extending rods each of which connects the ends of said horizontally extending rods respectively at both ends thereof, and a series of consecutive protrusion plates which are formed by two substantially triangular plates between each adjacent horizontal rods, wherein the upper side and lower side of said protrusion plate are secured on the adjacent horizontal rods respectively and the middle portions of said protrusion plates protrude forward in a certain height.

2. The filler as claimed in claim 1, wherein on said protrusion plates there are formed stepped portions or rounded protrusions.

3. The filler as claimed in claim 1, said filler further comprises protruded male-female type connections on each corner thereof.

4. The filler as claimed in claim 1, wherein the protrusion plates are staggered in a certain pitch between adjacent rows of the protrusion plates.

5. An assemblage of the fillers formed by stacking the fillers defined as in claim 3 in lateral direction.

6. The assembly as claimed in claim 5, wherein said assemblage has a certain curvature or curvatures.

* * * * *